United States Patent [19]

Barthe et al.

[11] 4,451,276
[45] May 29, 1984

[54] METHOD AND APPARATUS FOR GLASS FIBERIZATION

[76] Inventors: Marie-Pierre Barthe, 5 bis, rue Marcel Duchemin, Clermont 60600; Jean A. Battigelli, 17, rue Edouard Vaillant; Francois Bouquet, 30, rue Edouard Vaillant, both of, Rantigny 60290, all of France

[21] Appl. No.: 409,336

[22] Filed: Aug. 18, 1982

[51] Int. Cl.³ .............................................. C03B 37/04
[52] U.S. Cl. ................................................ 65/6; 65/14
[58] Field of Search ........................... 65/6, 8, 14, 15; 503/35, 38

[56] References Cited
U.S. PATENT DOCUMENTS

| 3,819,345 | 6/1974 | Battigelli | 65/6 |
| 3,928,009 | 12/1975 | Perry | 65/14 |
| 3,936,286 | 2/1976 | Dunkailo | 65/14 |
| 4,203,745 | 5/1980 | Battigelli | 65/6 |
| 4,203,747 | 5/1980 | Fezenko | 65/6 |

FOREIGN PATENT DOCUMENTS 1118513  7/1968  United Kingdom .

OTHER PUBLICATIONS

Glass and Ceram. (U.S.A.), vol. 34, #5-6, S 90200058, Pub. Jan. 1978, pp. 294-298.

Primary Examiner—Robert L. Lindsay, Jr.
Attorney, Agent, or Firm—John T. Synnestvedt; Richard D. Weber

[57] ABSTRACT

Glass fibers for insulation uses are produced by means of a centrifugal spinner which introduces glass streams into an annular attenuating blast adjacent the periperhy of the spinner. An improved product quality and/or production rate as well as prolonged spinner life are obtained by selection and utilization of a novel combination of structural and operating parameters characterized in particular by a spinner diameter and peripheral speed substantially greater than conventionally employed. The present technique further provides reduced turbulence in the receiving chamber and hence an improved distribution and orientation of the fibers on the collecting conveyor.

6 Claims, 7 Drawing Figures

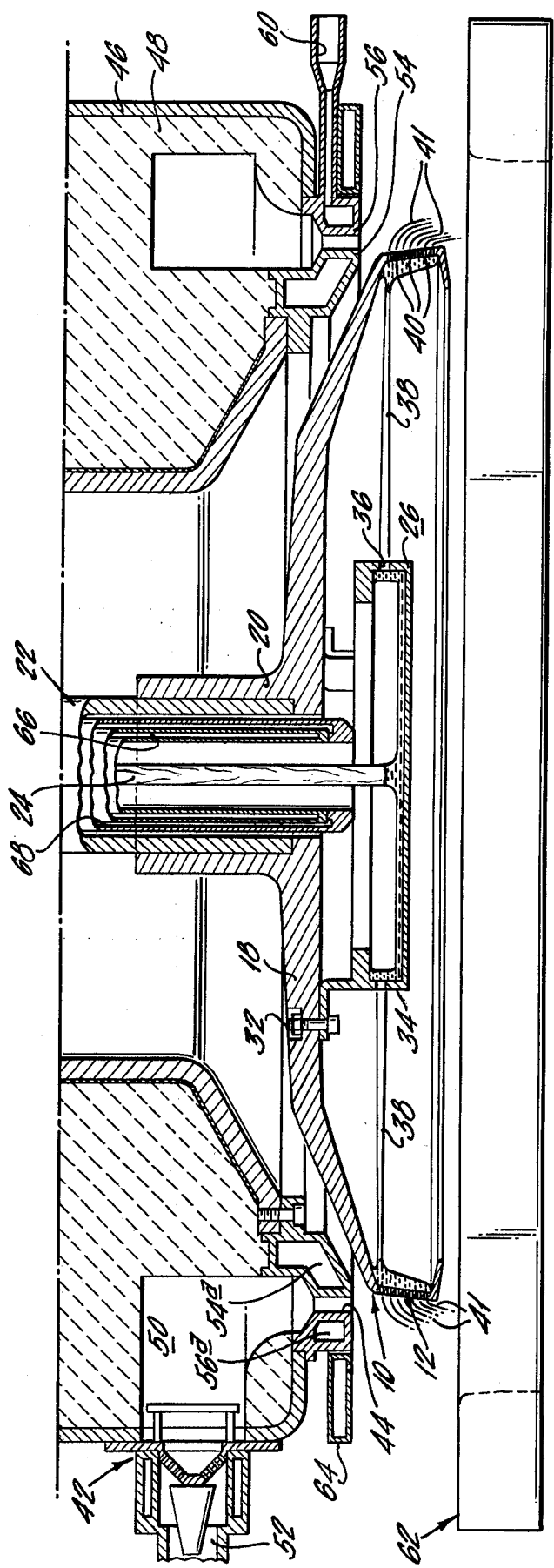

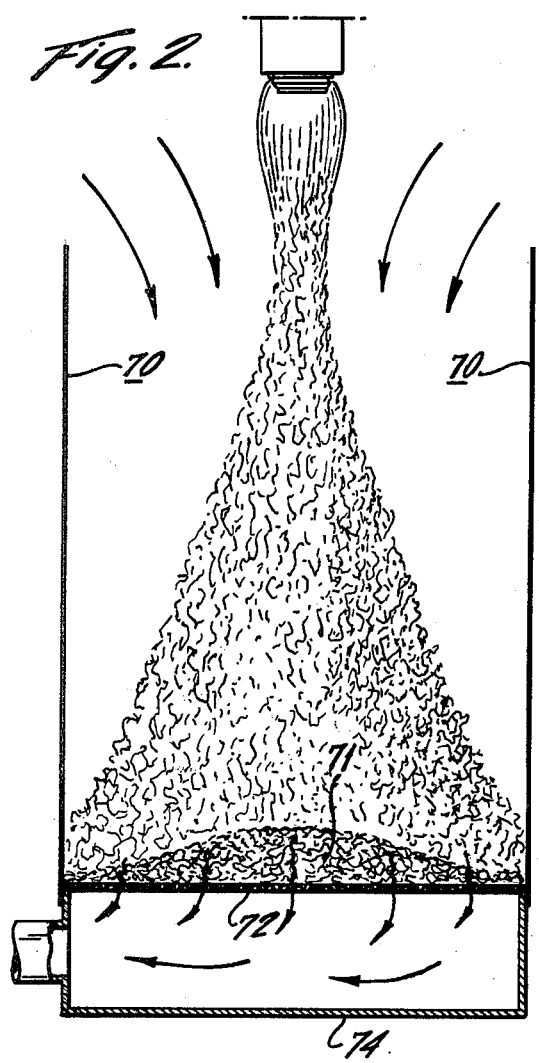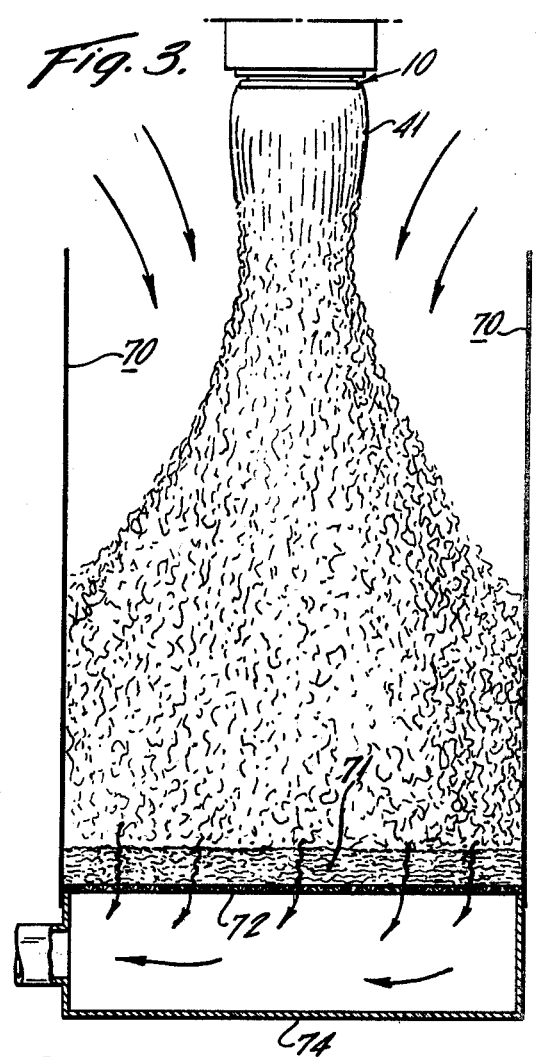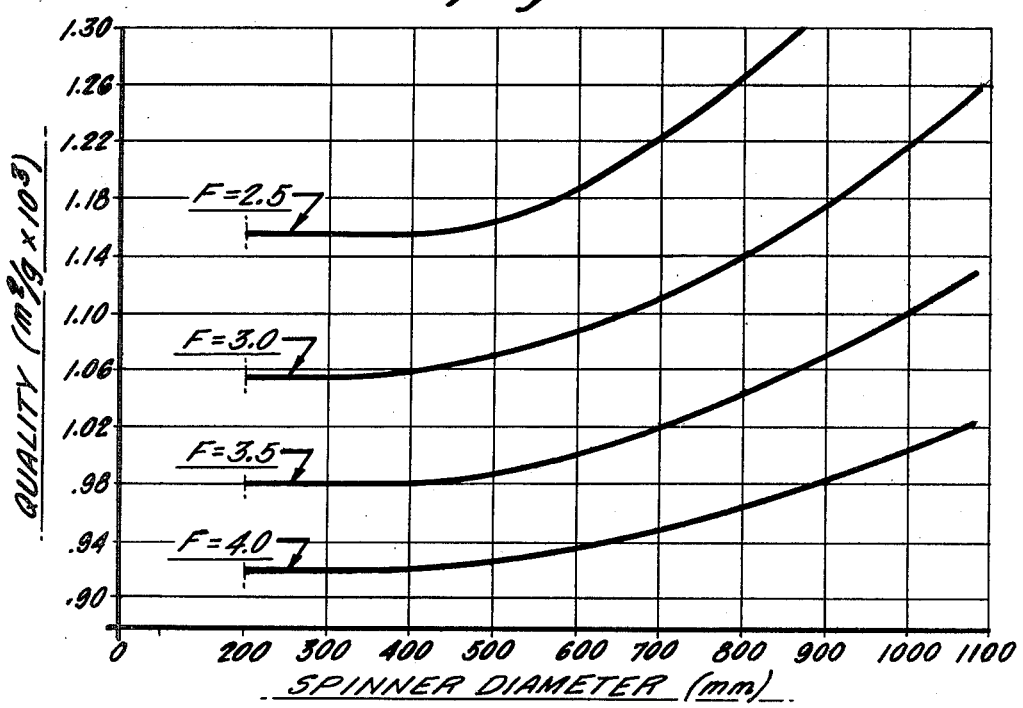

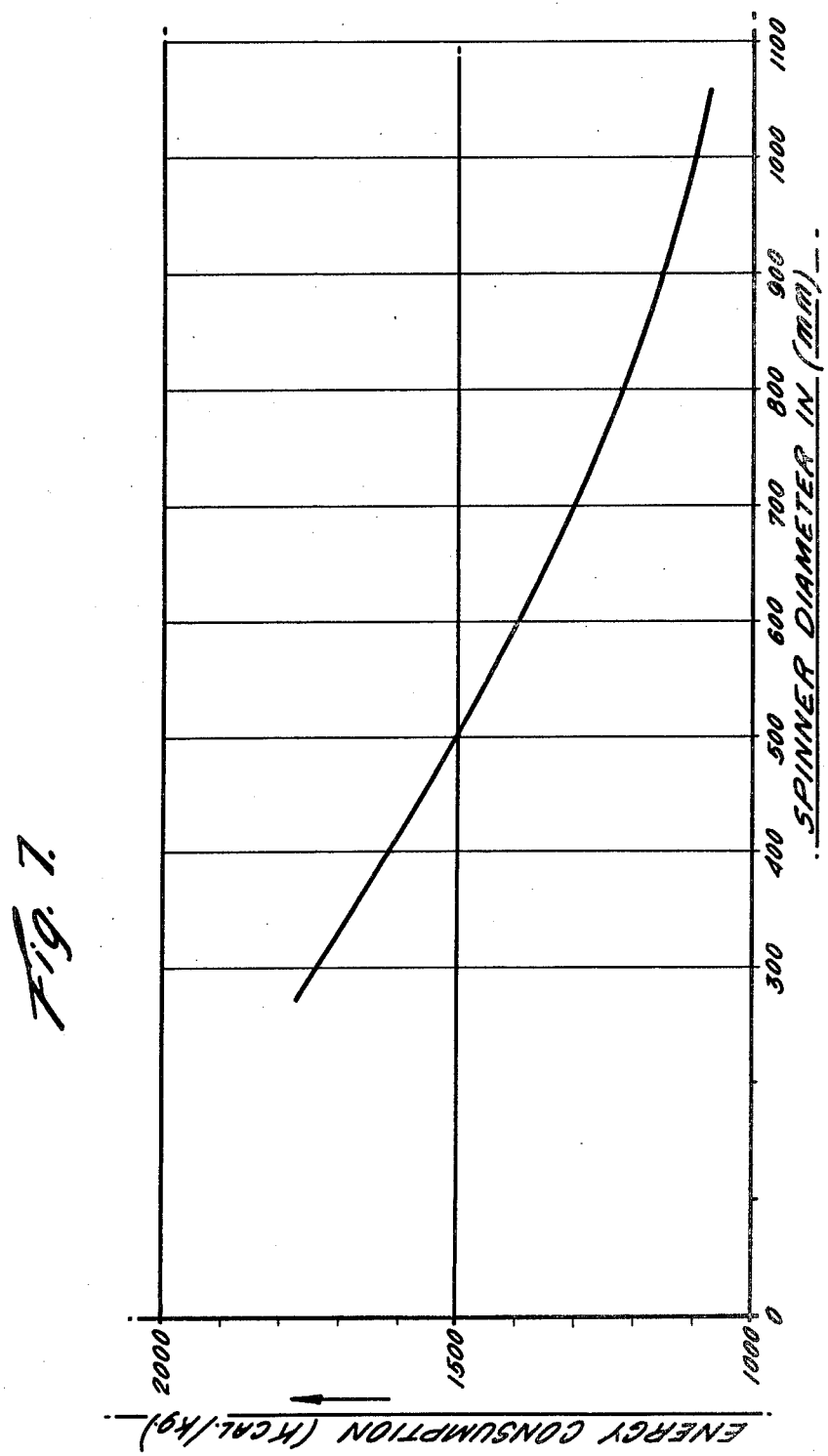

METHOD AND APPARATUS FOR GLASS FIBERIZATION

BACKGROUND OF THE INVENTION

1. Field of the Invention

The present invention relates generally to the fiberization of glass or other thermoplastic materials and relates more particularly to fiberization techniques wherein the molten material to be fiberized is centrifugally converted by a rapidly rotating spinner into a multiplicity of glass streams which are attenuated into fibers by a concentric annular gaseous blast from an internal combustion burner adjacent the periphery of the spinner directed perpendicularly to the centrifugal stream, such a fiberization technique being herein referred to as "centrifugal blast attenuation". The fibers, after being sprayed with a binder, are collected on a foraminous conveyor in the form of a blanket or mat, which is then passed through a curing oven.

2. Description of Prior Art

The centrifugal blast attenuation glass fiberization technique generally described above has been used industrially for many years in the production of glass fiber insulation products, and a substantial percentage of glass fiber insulation manufactured at the present time is produced utilizing this technique. Details of various forms of this process are disclosed for example in U.S. Pat. Nos. RE 24,708 2,984,864, 2,991,507, 3,007,196, 3,017,663, 3,020,586, 3,084,381, 3,084,525, 3,254,977, 3,304,164, 3,819,345 and 4,203,745.

In carrying out this technique, substantial amounts of heat energy are required, first for heating the glass into a molten state, and secondly for producing the attenuating blast. The uncertain availability and high cost of energy have created an increasing demand for glass fiber insulation products, while the same factors have caused a substantial increase in the cost of producing such products.

Efforts have accordingly been made to improve the efficiency of the described fiberization process or to utilize alternate fiberization techniques. For example, some glass fiber production has in recent years been carried out utilizing a purely centrifugal fiber attenuation, primarily to avoid the energy requirements of the blast attenuation technique. Such a process is disclosed for example in U.S. Pat. No. 4,058,386.

Centrifugal stream formation coupled with blast attenuation as generally described above remains a preferred technique however, both because of the excellent quality of the fiber blanket obtained therewith as well as the fact that a substantial portion of the insulation industry is equipped at present with apparatus for carrying out such a process. It accordingly follows that any improvement in this technique would be of significant industrial importance. As will be understood from the following disclosure, the present invention provides marked improvements in centrifugal blast attenuation fiberizing techniques with respect to product quality, production rate, and operating costs.

Inasmuch as glass fiberization is in practice an extremely complex technique characterized by a large number of variable parameters, many of the details of known techniques need not be included herein, reference being made to the above patents for such disclosures. However, certain limited aspects of the prior art will be considered, especially concerning those factors respecting which the present invention departs substantially from prior practice.

Among the many variables to be considered, the construction of the spinner and the speed at which it rotates are of particular importance in successfully carrying out a centrifugal fiberization process. In addition, the diameter of the spinner, the size, number and arrangement of the orifices in the peripheral spinner wall, the alloy from which the spinner is made as well as the shape of the spinner wall, the distribution of molten glass to the interior spinner wall and the control of the temperature of various portions of the spinner assembly and the glass flowing therewithin are factors which must be carefully considered.

In the centrifugal blast attenuation process, the blast temperature and velocity, as well as the placement of the blast nozzle and direction of the blast with respect to the spinner wall are important to an optimization of the fiber attenuation. Spinner life is an important factor, particularly in view of the relatively short life of this type of spinner and the extremely high cost of spinner replacement.

The spinners used in early centrifugal blast attenuation equipment were typically of a diameter of about 200 mm and the peripheral wall thereof included typically 4,000 to 6,000 holes through which the molten glass passed to form the primary glass streams subjected to attenuation by the annular blast. It was perceived at an early date that for a spinner of given size and construction, the output or pull rate, conventionally expressed in terms of the weight in tons per day of produced fiber, could be increased only at the expense of a corresponding decrease in fiber quality. It was further perceived that there were practical limits to the pull rate per spinner orifice for maintaining acceptable fiber quality, the maximum rate per orifice ranging between about 1 and 1.4 Kg/day. Nonetheless, the economic demands for increasing production of a given line usually resulted in an increase in pull rate despite the deterioration in product quality. The term "quality" in this sense refers to the product weight per unit of area for a given thermal resistance and nominal product thickness. A lower quality product would hence be a heavier product although with the same insulating value as the better quality product. The lower quality product is thus lower in quality not only since it has a higher density, but also in the sense that it is inherently a more expensive product, requiring more glass for a given area, and is thus more costly to manufacture.

In an effort to increase the output of a spinner of given diameter, the number of holes in the peripheral wall of the spinner was increased. Although some increase in pull rate was achieved, there are practical limits of orifice density controlled by factors such as the necessity of maintaining discrete glass streams emerging from the periphery of the spinner and manufacturing problems. Similar considerations limit the degree to which the spinner peripheral wall can be increased in height to increase its area.

Since the pull rate per orifice, orifice density, and height of the spinner wall could not be further increased without sacrificing fiber quality below acceptable limits, efforts to increase the pull rate were directed toward increase of the spinner diameter, initially to 300 mm and more recently to 400 mm. Although each such increase in diameter produced some increase in pull rate and/or an improvement in fiber quality, the improvements were modest in comparison with those of the present invention.

Another limiting factor is the centrifugal acceleration produced by the high rate of spinner rotation. Although substantial centrifugal forces are required to produce the necessary flow of molten glass through the spinner orifices and to thereby form the primary glass streams, high centrifugal forces foreshorten the life of the spinner.

Since spinner life is substantially inversely proportional to the spinner centrifugal acceleration forces, it has heretofore been considered desirable to restrict rotational speeds of the spinner as much as possible in an effort to extend the spinner life.

Due to the detrimental effects of higher centrifugal acceleration on spinner life and the uncertain effects of higher peripheral speeds on fiber attenuation, the conventional wisdom when increasing spinner diameter has been to decrease or refrain from increasing the centrifugal acceleration and to hold peripheral velocity within a range known to give satisfactory attenuation.

A further factor is of importance, namely the fineness (average diameter) of the fibers. It is well established that for a given density of fiber mat layer, the finer the fibers, the greater the thermal resistance of the layer. An insulating product comprising finer fibers can accordingly be thinner with the same insulating value as a thicker product of coarser fibers. Or, likewise, a product of finer fibers can be less dense than one of coarse fibers of the same thickness and have the same insulating value.

Since sales of insulation products are usually based on a guaranteed thermal resistance (R value) at a nominal thickness, the fiber fineness is an important factor determining the weight of the product per unit of area, known as the basis weight, a product of finer fibers having the lower basis weight and hence requiring less glass and enjoying manufacturing economies.

From an economic standpoint, however, fiber fineness, as with other factors, is normally considered to be a compromise since the attainment of finer fibers is thought to flow principally from higher blast velocities and from the use of softer glass compositions. Increasing the blast velocity results in a direct increase in energy costs, and softer glasses typically require ingredients which are expensive and which, further, usually have undesirable pollutant characteristics.

Fineness, which can be expressed in terms of fiber diameter, in microns, representing the arithmetic mean value of measured fiber diameters, is also conveniently expressed on the basis of a fiber fineness index, or a "micronaire" determination, the latter being a standard measuring technique in the glass wool industry wherein a predetermined mass or sample, for example 5 grams of the fibers, is positioned within a housing of a given volume so as to form a permeable barrier to air passing through the housing under a predetermined pressure and the measurement is made on the air flow through the sample. The measurement thus made depends on the fiber fineness.

In general, the finer the fibers the more resistance offered to the passage of air through the sample. In this manner an indication is given of the average fiber diameter of the sample. The fineness of typical blast attenuated centrifugal glass fiber insulation products ranges from fine types (i.e. micronaire 2.9 (5 g); average diameter 4 $\mu$m) to relatively coarse types (i.e. micronaire 6.6 (6 g); average diameter 12 $\mu$m).

The insulating value of a blanket of fibers is dependent to a limited although significant degree on the lay-down of the fibers on the collecting conveyor, which determines the orientation of the fibers in the insulation product. The thermal resistance of a fiber blanket will vary depending on the direction of orientation of the fibers to the measured heat flow, the resistance being greater when the fibers are oriented perpendicular to the direction of heat transfer. Accordingly, to maximize the thermal resistance of an insulating blanket, the fibers should be oriented to the maximum degree possible in an attitude parallel to the collecting conveyor and the plane of the blanket formed thereon. Because of the extreme turbulence generated above the collecting conveyor by the decelerating fibers and gaseous currents, there is very little that can be done to control the orientation of the fibers, most efforts in this area of the fiberizing process being directed toward achieving a relatively uniform distribution of fibers across the width of the conveyor.

BRIEF SUMMARY OF THE INVENTION

In an effort to increase fiber production still further while maintaining or possibly improving the quality of the fibers, experiments were undertaken with still larger spinners having diameters of 600 mm and over. Surprising improvements in pull rate and/or quality were achieved although for reasons some of which at the present time are not entirely clear. Particularly unexpected were improvements in the fiber quality which exceeded forecasts by 10–25% depending on the pull rate utilized.

In making the transition from a 400 mm to a 600 mm spinner, the spinner rotational speed was reduced to provide centrifugal accelerating forces on the glass and spinner wall within conventional limits such that the glass feed through the orifices, as well as the stresses placed on the spinner wall structure, would not depart significantly from prior practice. It was feared that the larger spinner diameter would, at the rotational speed necessary to produce such centrifugal force, result in an unacceptably high peripheral speed of the spinner with a consequent degradation of fiber formation and attenuation. Surprisingly, the fiberization was not adversely affected by the higher peripheral speed as evidenced by the improved fiber quality and/or pull rate as compared with lower peripheral speeds.

The present invention in summary comprises techniques including both apparatus and method for producing glass fibers, and fibrous insulation blanket made therefrom, including a spinner mounted for rotation about a substantially vertical axis, the spinner having a diameter substantially greater than 500 mm and preferably within the range of from about 550 or 600 mm to about 1500 mm.

The apparatus additionally includes means for supplying a stream of molten glass to the spinner for centrifugal delivery to the interior surface of the peripheral spinner wall. This wall includes a plurality of orifices through which the molten glass passes and forms a multiplicity of streams. The invention contemplates use of a spinner having orifices of at least 0.7 mm in diameter and contemplates formation of fibers from the centrifugally delivered streams by the use of gas blast attenuation.

The technique of the invention includes an internal combustion burner providing a downwardly directed annular blast adjacent the spinner wall to attenuate the glass streams into fibers. The fibers are delivered downwardly into a receiving hood or receiving chamber and are collected on a substantially horizontal foraminous conveyor disposed at the bottom of the receiving chamber.

Still further the invention contemplates a peripheral spinner velocity substantially higher than heretofore conventionally employed and preferably in the range of about 50 m/s to about 130 m/s.

The invention is further directed to a glass fiber insulation blanket produced by the described process.

Although efforts have been undertaken to isolate the principal factors responsible for the improved performance of the larger spinner, at the present time these efforts have not been conclusive.

The following disclosure will present a detailed description of the apparatus and process utilized in obtaining the improved performance as well as a description of the improved product obtained thereby.

Such theoretical explanations as are set forth in this specification must be recognized to be tentative, subject to further experimental verification, and not taken to be limiting.

BRIEF DESCRIPTION OF THE DRAWINGS

FIG. 1 is a partial sectional elevational view showing a spinner assembly and burner in accordance with the present invention;

FIG. 2 is a schematic elevational view showing the operation of a conventional small diameter spinner and fiber collecting conveyor, the view being taken transversely through the conveyor and illustrating the uneven distribution and random orientation of fibers on the conveyor in the absence of fiber distribution means;

FIG. 3 is a view similar to FIG. 2 but employing a large diameter spinner operating in accordance with the invention showing the relatively uniform distribution and relatively uniform orientation of fibers on the conveyor in the absence of fiber distribution means;

FIG. 6 is a graph showing fiber quality plotted against spinner diameter for fibers of various degrees of fineness; and FIG. 7 is a graph showing energy consumption plotted against spinner diameter for fibers produced at constant centrifugal acceleration.

DESCRIPTION OF THE PREFERRED EMBODIMENT

Figure 4:
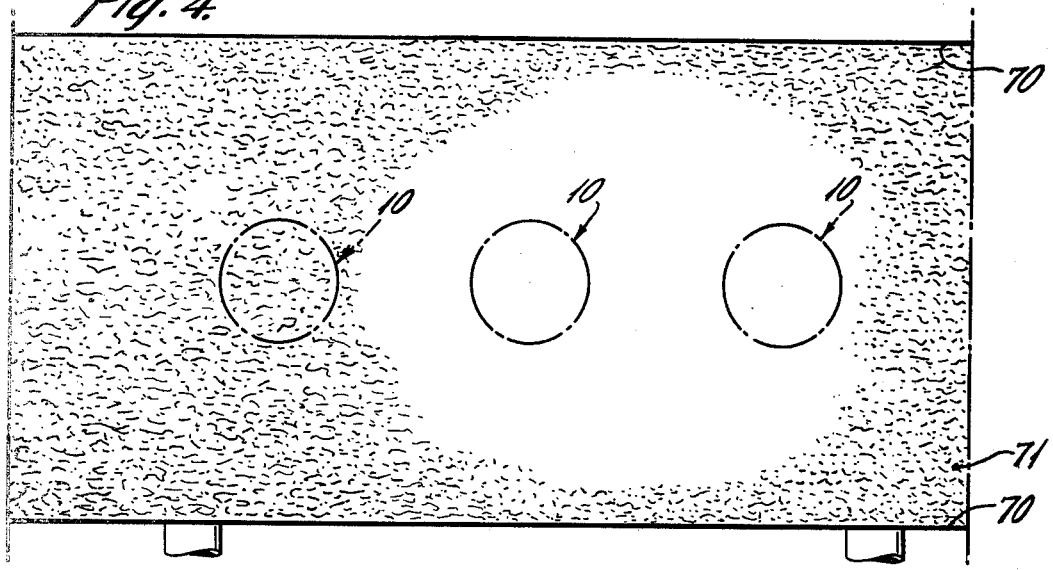
FIG. 4 is a schematic plan view showing a plurality of spinners and their arrangement with respect to the conveyor.

Referring to the drawings and particularly FIG. 1 thereof, a fiberizing station in accordance with the present invention is illustrated including a spinner 10 having a peripheral wall 12 and a support plate 18. The spinner 10 is mounted by means of a hub portion 20 to a substantially vertical shaft 22. The shaft 22 is rotatably supported in a well known manner by suitable bearin9s attached to a supportin9 frame and is driven in rotation at a relatively uniform predetermined speed by an electric motor and belt drive. The shaft support and drive details are conventional and accordingly are not illustrated.

The shaft 22 is hollow, permitting a stream of molten glass 24 to pass downwardly therethrough into a basket 26 supported beneath the lower end of the shaft by bolts 32.

The basket 26 comprises a substantially cylindrical wall 34 having a plurality of orifices 36 through which the molten glass passes under the influence of centrifugal force in streams 38 which are directed onto the interior of the spinner wall 12. A multiplicity of orifices 40 in the peripheral wall 12 of the spinner serve to form a multiplicity of molten glass streams 41 as the molten glass is forced through the orifices by the centrifugal force acting thereon.

As discussed hereinafter, the diameter of the spinner, the size and density of the orifices 40, as well as the speed of rotation of the spinner are parameters important to the fiberizing process.

An annular internal combustion burner 42 of substantially conventional construction is disposed above the wall of the spinner and includes an annular blast nozzle 44 spaced above the spinner peripheral wall 12 so as to direct an annular blast downwardly adjacent the spinner wall 12 to intercept and attenuate the multiplicity of glass streams 41 issuing from the orifices 40. The burner 42 includes a metal casing 46 enveloping a refractory liner 48 defining an annular combustion chamber 50 into which an air-fuel mixture is introduced at inlet 52. The blast nozzle 44 communicates with the combustion chamber 50 and is formed by inner and outer nozzle lips 54 and 56. The blast nozzle lips 54 and 56 respectively include internal cooling channels 54a and 56a into which a cooling liquid such as water is introduced by inlet 60 for circulation to an outlet (not shown).

In order to maintain the heat content of the spinner and fibers during attenuation, a high frequency induction heating ring 62 is provided just below the spinner in concentric relation thereto and having an internal diameter somewhat larger than the spinner to avoid interference with the downward flow of fibers entrained by the annular blast.

An auxiliary blast is generated by an annular blowing crown 64 disposed outboard of the blast nozzle lips and connected to a source of pressurized gas such as air, steam or combustion products.

The hollow shaft 22 includes several fixed concentric internal tubes. The innermost pair of these tubes defines an annular cooling passage 66 through which cooling water is circulated while the outermost pair define an annular passage 68 through which a combustible mixture can be passed and ignited to preheat the basket 26 prior to startup of the spinner.

Figure 5:
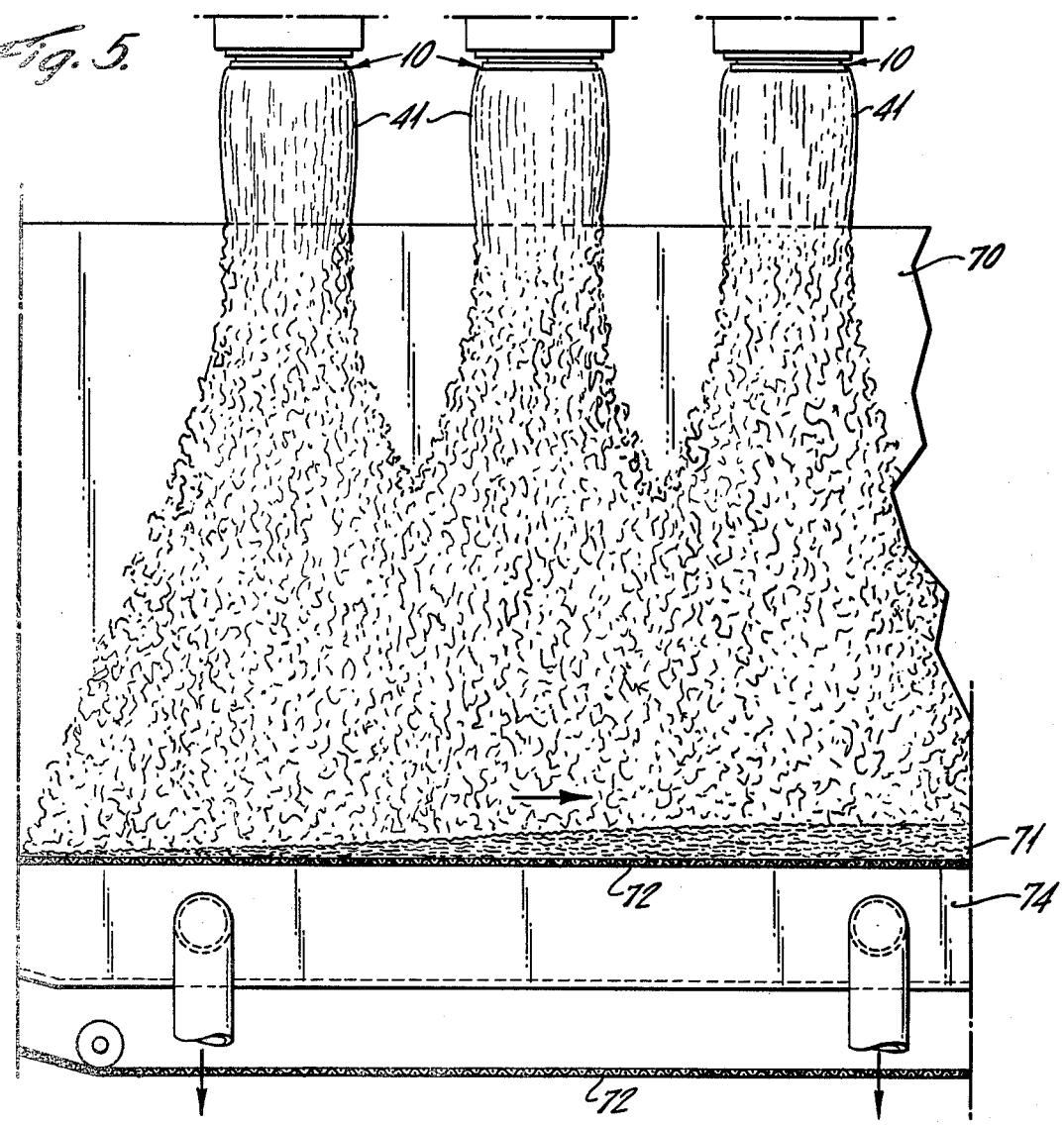
FIG. 5 is a schematic elevational view of the apparatus shown in FIG. 4.

The fibers generated by the spinner and the gaseous blast pass downwardly into a receiving chamber or receiving hood 70 and are thence deposited in the form of a blanket 71 on a foraminous conveyor 72 as shown schematically in FIGS. 2, 3 and 5. A suction box 74 beneath the conveyor withdraws the high volume of gases passing through the conveyor in a conventional manner.

As shown in FIGS. 4 and 5, a plurality of fiberizing stations each having a spinner 10 are conventionally employed for the production of the blanket 71 and in the preferred form of the invention are arranged in a line along the longitudinal axis of the conveyor 72. The number of spinners directing fibers onto a conveyor in an industrial installation might typically be six to ten spinners or more.

For operation of the described apparatus, the spinner 10 including the basket 26 thereof is preheated in a well known manner utilizing the combustion of gases passing through passage 68, the heat of the burner 50 and heating ring 62 and similar supplemental sources as may be necessary.

With the spinner rotating at a predetermined speed and the burner adjusted to provide a combustion chamber pressure resulting in a blast velocity sufficient to provide the desired attenuation and fineness of the fibers, the molten glass stream 24 is introduced into the hollow spinner shaft 22 from a forehearth or other source of molten glass disposed above the spinner assembly. The stream of molten glass upon reaching the basket 26 flows along the bottom of the basket under the influence of centrifugal force and passes through the orifices 36 of the basket in the form of glass streams 38 which are directed onto the upper portion of the spinner peripheral wall 12.

Under the influence of the stronger centrifugal force exerted at the wall 12, the glass passes through the multiplicity of small orifices 40 and issues at the exterior of the peripheral wall in the form of a multiplicity of streams 41 which are immediately subject to the attenuating effect of the blast from the internal combustion burner 50 directed across the exterior of the wall. The glass streams 41 are maintained in an attenuable condition by the elevated temperature of the blast for a time sufficient to effect attenuation thereof. The fineness of the attenuated fibers is regulated primarily by the control of the blast velocity which in turn is a function of burner pressure. An increase in burner pressure and blast velocity will result in a greater attenuation and hence finer fibers.

The flow of attenuated fibers into the receiving chamber or receiving hood 70 as shown in FIGS. 3 and 5 is accompanied by the induction of substantial amounts of air as shown by the arrows at the top of the receiving chamber. Although the induced air tends initially to restrict the expansion of the veil of fibers flowing from the spinner, the rapid deceleration of the fibers within the receiving chamber produces a substantial expansion of the fiber veil and, for reasons discussed in more detail herebelow, provides a relatively uniform distribution of the fibers amid the product and across the width of the conveyor. Furthermore, due to a diminution of the turbulence usually present in the conveyor region, the invention produces a more favorable orientation of the fibers during the formation of the fiber blanket with a resultant improvement of the thermal properties of the blanket.

Although a binder spray is applied to the attenuated fibers at the top of the receiving chamber in a conventional manner, the showing of the apparatus for applying the binder has been omitted in FIGS. 2-5 to simplify these figures.

The diameter of the spinner and the speed of spinner rotation are important factors in the present technique.

The largest spinners in industrial use in centrifugal blast attenuated processes have heretofore had a diameter on the order of 400 mm and a peripheral velocity of approximately 44 m/s. An increase in spinner diameter and peripheral velocity had not been deemed feasible, even if centrifugal acceleration were not increased, since peripheral velocity would increase to a degree which was thought to present difficulties in fiber attenuation.

It has been discovered, however, that substantial increases in spinner diameter and peripheral velocity have no adverse effects on fiberization, and in fact, produce fiber of improved quality when operated at the same pull rate per spinner as the 400 mm sized spinner. For example, a spinner of 600 mm in accordance with the present invention can be operated at a pull rate about 50% higher than a 400 mm spinner while producing the same quality fiber. The economic advantages of such an improvement are evident, particularly when it is considered that the output of a given production line can be increased by at least 50% utilizing the invention with modifications requiring a capital outlay in a typical situation of less than 3% of the cost of a new production line.

Considering further the factor of spinner diameter, excellent results have been achieved utilizing a spinner of 600 mm diameter and substantially larger spinners can be used. The benefits of the invention can be attained with spinners having a diameter substantially in excess of 500 mm and within the range of about 550 mm to about 1500 mm. The preferred range of spinner diameter is 600 mm to 1000 mm.

It has been found that fiberization and hence fiber quality is generally improved with increased peripheral speed and increased centrifugal acceleration, although the latter is detrimental to spinner life. By selecting a spinner rotational speed providing centrifugal acceleration forces not significantly departing from those conventionally utilized in smaller spinners, for example within the range of about 8,000 to 14,000 $m/s^2$, the peripheral speed with the larger size spinners would be significantly higher than that conventionally employed with smaller spinners with a resultant improved fiber quality. The spinner life would not be decreased, the larger spinners experiencing substantially the same centrifugal forces as the smaller conventional spinners. For example, with a 600 mm spinner operating at a speed producing a centrifugal acceleration of 10,600 $m/s^2$, the peripheral speed would be 56.5 m/s, substantially higher than the peripheral speed of 46 m/s of the conventional 400 mm spinner operating at the same centrifugal acceleration.

The present invention contemplates a rotational speed of the spinner which, taking account of the preferred range of spinner diameters as described above, would produce a centrifugal acceleration at the spinner peripheral wall within the range of about 4,000 to about 20,000 $m/s^2$ and a peripheral speed ranging substantially between about 50 and about 130 m/s. It is expected that the centrifugal acceleration would in practice range between about 6,000 to about 16,000 $m/s^2$, particularly in view of the improvement in fiber quality noted within this latter range. Since fiber quality improves with increasing centrifugal acceleration and peripheral speed, the only detriment to operating toward the upper end of the above ranges is the reduced spinner life.

The graph of FIG. 6 illustrates the operation of spinners of various sizes, at a substantially constant centrifugal acceleration of about 10,000 $m/sec^2$. It is to be noted that fiber quality, for fiber finenesses of 2.5, 3.0, 3.5 and 4.0 (under 5 grams), significantly and sharply improves, as is graphically shown by the distinct change in the angle of curvature, at spinner diameters substantially in excess of 500 mm.

Taking into account the preferred ranges of spinner diameter and centrifugal acceleration described above, the peripheral velocity of the spinner should in practice range between about 66 m/s and about 90 m/s. The preferred range of peripheral velocity is from about 55 m/s to about 75 m/s.

In view of the foregoing ranges of peripheral speed, spinner diameter and centrifugal acceleration, the spinner rotational speed would range from about 800 rpm to about 2500 rpm.

The diameter of the spinner wall orifices 40 should be at least 0.7 mm and preferably from about 0.8 mm to about 1.2 mm. The density of the orifices should be at least 15 orifices per square centimeter of the perforated part of the wall and preferably between 15 and 30 orifices per square centimeter. A preferred density is about 35 orifices per square centimeter.

Another factor having an important bearing on fiber production is the burner pressure, the control of which directly affects the fiber fineness.

Utilizing a burner of the type shown in FIG. 1, a preferred range of burner pressure is between about 100 and about 900 mm water column with a preferred pressure of 400 mm water column. For reasons not totally understood, the required burner pressure necessary to produce a fiber of a certain fineness decreases with increasing spinner diameter, even though the centrifugal acceleration is not increased. This factor may be a cause of the improved fiber quality as well as the energy saving noted with the larger spinners since the lower burner pressure results in longer fibers with less fiber breakage.

The width of the burner nozzle 44 preferably is within the range of about 5 mm to about 15 mm with a preferred width of about 8 mm. The burner temperature preferably ranges between about 1300° C. and 1700° C. with a preferred temperature of about 1500° C.

With spinners contemplated by the present invention, it has been found that an improved distribution of the fibers on the conveyor as well as an improved orientation of the fibers within the blanket could be obtained.

Measurements were made on products obtained according to the prior technique and products obtained with the technique of the present invention.

There are several methods of measuring the distribution within the product. One of the more simple ones involves cutting the product into a series of small parallelipipeds or "cubes" (for example of 25×25×45 mm in size) which are individually weighed. The various weights, which can be expressed in local densities related to the center of gravity of each "cube", give a three dimensional image of the distribution. To facilitate the comparisons the coefficient of variation $C_v$ of the distribution is calculated by the quadratic differential (square root of the mean value of the differentials squared) to the mean value of the weight of the "cubes".

For example, a very significant differential was found between a product obtained with the prior technique ($C_v=6.1\%$) and that obtained with the technique of the present invention ($C_v=2.6\%$).

In the example of the invention illustrated in FIG. 3, the relatively large diameter of the spinner results in a veil of fibers which expands before reaching the conveyor and the width of which is greater than the width of the conveyor, the fibers around the edge of the veil at each side of the conveyor encountering the sides of the receiving hood 70 and being redirected inwardly to produce a blanket 71 of relatively uniform thickness. The lay-down of the fibers occurs with a minimal amount of turbulence and accordingly results in a fiber orientation predominately parallel to the direction of the conveyor.

In contrast, an example of the prior art is shown in FIG. 2 wherein the fiber veil is seen to be too narrow to reach the walls of the receiving hood and, as a result, due to the typical concentration of fibers in the center of the veil, the blanket is nonuniform, being disproportionately thick in the center and thin at the sides. Furthermore, in contrast to the lay-down of the fibers with the larger spinner shown in FIG. 3, a substantial turbulence occurs around the edge of the veil proximate the conveyor, which turbulence results in a disorganized laydown of the fibers, the fiber orientation being substantially less parallel to the conveyor than that produced with the present apparatus and method.

Because of the poor distribution attainable with the conventional smaller spinners operating under conventional parameters, various auxiliary means have been employed in an effort to improve the fiber distribution.

With the wide conveyors it is possible to place transversely two, three or more fiberizing units in a transverse direction to the conveyor. However, even if theoretically this arrangement enables a uniform distribution, it presents the major disadvantage that for any stoppage of a single unit of the row, for example to change the spinner, the disorganization of the distribution resulting from this stoppage leads to the rejection of the product formed by all the other units during the span of the intervention. For this reason it is generally preferable to arrange the fiberizing units in a single line longitudinally to the conveyor, since, in this case, any stoppage of a unit would not appreciably alter the distribution and it would be possible to continue to produce—production only being minimized by the lower pull rate of the halted unit.

With the units arranged in this manner, various types of auxiliary distribution means are employed in an effort to improve the fiber distribution. These distribution means include for example jet nozzles in the side of the receiving hood (U.S. Pat. No. 3,030,659), oscillating or alternately fed blower rings, baffles controlling induced air (U.S. Pat. No. 3,255,943), oscillating conduits for the fiber veils (U.S. Pat. No. 3,830,638) and the oscillation of the spinner assembly (U.S. Reissue Pat. No. RE 30,192). Although such devices may achieve an improved fiber distribution, they generally introduce even more turbulence into the receiving chamber, thereby causing an even less favorable orientation of the fibers in the blanket. Since the fiber orientation is extremely important in a fiber insulating medium, with a fiber orientation parallel to the conveyor providing improved thermal resistance characteristics, it can be understood that the larger veil produced by the large spinners in accordance with the invention is an important factor in optimizing the quality of the fibrous blanket. Furthermore, the expense of auxiliary distribution devices and the cost of their operation can be minimized or eliminated with the present invention.

The shape of the veil of fibers directly beneath the spinner can be seen to be more favorable in FIG. 3 than in FIG. 2, the veil in FIG. 3 having relatively little contraction beneath the spinner whereas that of FIG. 2 is substantially contracted in this region. The cause of this improvement is not as yet known but may be a result of the increased spinner peripheral speed which in some manner counteracts the constricting effect of the induced air.

The significant decrease in energy consumption with increased spinner diameter can be readily seen from the graph of FIG. 7. The curve of the graph represents fiberization at constant centrifugal acceleration of 10,000 m/s². This curve was obtained utilizing conditions of similitude wherein the glass, the spinner height, orifice density, orifice size, orifice pull rate, and fiber quality were held constant for production of a fiber blanket having an insulating value of R=2 W/m²K at 297° K.

Although it is expected that the present apparatus and method can be effectively utilized with any of the glass compositions conventionally employed for producing glass fibers by centrifugal blast attenuation, the glass composition preferably falls within the following ranges:

| | |
|---|---|
| SiO₂ | 61 to 72% |
| Al₂O₃ | 2 to 8% |
| Fe₂O₃ | 0.2 to 1% |
| CaO | 4.7 to 7.5% |
| MgO | 0 to 5% |
| Na₂O + K₂O | 14 to 18% |
| B₂O₃ | 0 to 6% |
| F | 0 to 1.5% |
| BaO | 0 to 2.5% |
| ZrO₂ | 0 to 2.5% |
| Misc | ≦1 |

The heat transfer characteristics of a fibrous material are usually expressed in terms of its apparent conductivity which is derived essentially from the sum of the conduction of the gas contained in the material, the solid conduction of the fibers and the radiation through the material. For fibrous insulation materials used in a confined space such as blankets of fibrous material used as building insulation, for the temperature ranges encountered, the heat transfer by convection is negligible and can be ignored. The apparent thermal conductivity can thus be expressed as follows:

$$\lambda = A + B(\rho) + C/\rho$$

where
$\lambda$ = apparent conductivity W/m°K.
A = conductivity of the gas
B = Coefficient of conductivity related to the solid part of the fibrous material
C = fiber surface area factor
$\rho$ = density of the fibrous material.

We have found that in the carrying out of the invention, suitable values for these factors are as follows:
A = $25.89 \times 10^{-3}$
B = $0.02 \times 10^{-3}$ to $0.2 \times 10^{-3}$, preferably $0.075 \times 10^{-3}$
C = 0.100 to 0.300, preferably 0.190
$\rho$ = 8 to 75

The apparent conductivity for fibrous insulation materials typically ranges between $30 \times 10^{-3}$ to 55 at 24° C. with the fiber fineness ranging between about 2 (5 g) to about 5 (5 g).

SPECIFIC EXAMPLES

The following are examples of operating parameters utilized in successfully carrying out the present technique.

| | Example No. | | |
|---|---|---|---|
| | I | II | III |
| Spinner Diameter (mm) | 600 | 600 | 1000 |
| Pull rate per spinner (metric Tons/day) | 20 | 20 | 20 |
| Number of orifices per spinner | 20,000 | 20,000 | 20,000 |
| Pull rate per orifice (average) (Kg/day) | 1 | 1 | 1 |
| Burner nozzle width (mm) | 7.7 | 7.7 | 6.5 |

-continued

| | Example No. | | |
|---|---|---|---|
| | I | II | III |
| Burner pressure (mm water) | 350 | 430 | 420 |
| Burner temperature °C. | 1500 | 1500 | 1500 |
| Centrifugal acceleration (m/s²) | 10,600 | 10,600 | 7888 |
| Peripheral velocity (m/s) | 56.5 | 56.5 | 62.8 |
| Fineness (micronaire under 5 g) | 3.5 | 3.0 | 2.5 |
| Density for R = 2 at 24° C. (Kg/m³) | 11.1 | 10.5 | 8 |
| Nominal Thickness (mm) | 90 | 90 | 90 |

The glass composition utilized in the Examples is as follows:
SiO₂: 64.10
Al₂O₃: 3.40
Fe₂O₃: 0.45
CaO: 7.20
MgO: 3.00
Na₂O: 15.75
K₂O: 1.15
B₂O₃: 4.50
Misc.: 0.20

We claim:
1. A method for centrifugally producing glass fibers from a glass composition as follows:

| | |
|---|---|
| SiO₂ | 61 to 72% |
| Al₂O₃ | 2 to 8% |
| Fe₂O₃ | 0.2 to 1% |
| CaO | 4.7 to 7.5% |
| MgO | 0 to 5% |
| Na₂O + K₂O | 14 to 18% |
| B₂O₃ | 0 to 6% |
| F | 0 to 1.5% |
| BaO | 0 to 2.5% |
| ZrO₂ | 0 to 2.5% |
| Misc | ≦1% | said method comprising the steps of introducing the glass in molten attenuable condition into a spinner for delivery to the interior surface of the peripheral wall thereof, said peripheral wall having a multiplicity of orifices therein, rotating said spinner to effect the centrifugal delivery of the glass through the spinner orifices in a multiplicity of streams, and attenuating said glass streams into fibers by means of an internal combustion burner providing a generally downwardly directed annular gaseous blast adjacent the exterior of said peripheral wall, said gaseous blast having an elevated temperature contributing to the maintenance of the glass streams in attenuable condition for a time sufficient to effect attenuation thereof, and wherein centrifugal acceleration at the spinner wall, the peripheral velocity of the spinner and the burner pressure fall within the following ranges:

| | |
|---|---|
| centrifugal acceleration | 4000 to 20000 m/sec² |
| peripheral velocity | 50 m/s to 130 m/s |
| burner pressure | 100 mm to 900 mm (water column). |

2. The method as claimed in claim 1 wherein the centrifugal acceleration, the peripheral velocity of the spinner and the burner pressure fall within the following ranges:

| | |
|---|---|
| centrifugal acceleration | 6000 to 16,000 m/sec² |
| peripheral velocity | 55 m/s to 90 m/s |

-continued

| | |
|---|---|
| burner pressure | 200 mm to 600 mm (water column). |

3. The method as claimed in claim 1 wherein the centrifugal acceleration, the peripheral velocity of the spinner and the burner pressure fall within the following ranges:

| | |
|---|---|
| centrifugal acceleration | 9000 to 12,000 m/sec$^2$ |
| peripheral velocity | 55 m/s to 75 m/s |
| burner pressure | 300 mm to 500 mm (water column). |

4. A method for producing a glass fiber blanket on a perforated conveyor with underlying suction means, the conveyor being located at the bottom of a fiber-receiving chamber having side walls at opposite edges of the conveyor, the method comprising delivering molten glass in attenuable condition to the inside surface of the perforated peripheral wall of a spinner mounted for rotation on a generally vertical axis and located in spaced relation above the conveyor and thereby centrifugally projecting streams of molten glass through the perforations, attenuating said streams to form fibers of substantially smaller diameter than said streams by subjecting the centrifugally projected streams to the action of a gaseous blast generated by an internal combustion burner, said gaseous blast having an elevated temperature contributing to the maintenance of the glass streams in attenuable condition for a time sufficient to effect attenuation thereof, and depositing the attenuated fibers on the conveyor by directing said gaseous blast in an annular path surrounding the peripheral wall of the spinner and extended from the spinner toward the conveyor and thereby carrying the attenuated fibers toward the conveyor, the annular path of the blast being exposed to ambient air in an upper region of the receiving chamber with resultant induction of ambient air, the blast flow spreading with consequent decrease of the attenuated fiber content in edge portions of the blast as it approaches the conveyor, and selecting a spinner of a diameter such that the spreading of the fiber-laden blast flow is sufficient to cause the fiber-laden glass flow to impinge upon the side walls of the receiving chamber appreciably above the conveyor and thereby deflect edge portions of the blast flow and fibers carried thereby, with resultant increase in fiber deposit along the edge portions of the conveyor, thereby tending to equalize fiber deposit across the width of the conveyor.

5. Apparatus for producing a glass fiber blanket, comprising a fiber-receiving chamber having side walls at opposite edges of a perforated horizontal fiber-collecting conveyor with underlying suction means, a spinner located in spaced relation above the conveyor and having a perforated peripheral wall, said spinner being mounted for rotation on a generally vertical axis, means for feeding molten glass in attenuable condition to the inside surface of said peripheral wall, the perforations of said wall being at least 0.7 mm in diameter, thereby providing for centrifugal projection of streams of molten glass, means for attenuating said projected streams to form fibers comprising an internal combustion burner having means for delivering an annular gaseous blast surrounding the peripheral wall of the spinner and directed generally downwardly toward the conveyor, the blast generator delivering an annular gaseous blast having an elevated temperature contributing to the maintenance of the glass streams in attenuable condition for a time sufficient to effect attenuation of the glass streams delivered through the perforations of the peripheral wall of the spinner and thereby carry the attenuated fibers downwardly toward the conveyor for deposit thereon under the influence of said suction means, the annular path of the blast being exposed to ambient air in an upper portion of the receiving chamber with resultant induction of air and spreading of the blast flow and consequent decrease of the attenuated fiber content in edge portions of the blast as it approaches the conveyor, and the diameter of the spinner and of the spreading fiber-laden blast flow generated by the blast generator being sufficient to cause the fiber-laden blast flow to impinge upon the side walls of the receiving chamber appreciably above the conveyor at opposite edges of the conveyor, with resultant inward deflection of the edge portions of the blast flow and of the fibers carried thereby and consequent increase in fiber deposit along the edge portions of the conveyor thereby tending to equalize deposit of fibers across the width of the conveyor.

6. A method for centrifugally producing glass fiber insulation blanket from a glass composition as follows:

| | |
|---|---|
| SiO$_2$ | 61 to 72% |
| Al$_2$O$_3$ | 2 to 8% |
| Fe$_2$O$_3$ | 0.2 to 1% |
| CaO | 4.7 to 7.5% |
| MgO | 0 to 5% |
| Na$_2$O + K$_2$O | 14 to 18% |
| B$_2$O$_3$ | 0 to 6% |
| F | 0 to 1.5% |
| BaO | 0 to 2.5% |
| ZrO$_2$ | 0 to 2.5% |
| Misc | $\leq 1\%$ | said method comprising the steps of introducing the glass in molten attenuable condition into a spinner for delivery to the interior surface of the peripheral wall thereof, said peripheral wall having a multiplicity of orifices therein, rotating said spinner to effect the centrifugal passage of the glass through the spinner orifices in a multiplicity of streams, and attenuating said glass streams into fibers by means of an internal combustion burner providing a generally downwardly directed annular gaseous blast adjacent the exterior of said peripheral wall, said gaseous blast having an elevated temperature contributing to the maintenance of the glass streams in molten condition for a time sufficient to effect attenuation thereof, wherein the centrifugal acceleration at the spinner peripheral wall, the peripheral velocity of the spinner and the burner pressure fall within the following ranges:

| | |
|---|---|
| centrifugal acceleration | 4000 m/sec$^2$ to 20000 m/sec$^2$ |
| peripheral velocity | 50 m/s to 130 m/s |
| burner pressure | 100 mm to 900 mm (water column) | thereby producing fibrous insulation blanket having the following characteristics:

| | |
|---|---|
| fineness | 2 (5 g) to 5 (5 g) micronaire |
| conductivity | $30 \times 10^{-3}$ to $55 \times 10^{-3}$ (W/m°K.) |
| density | 8 to 75 (Kg/m$^3$). |

* * * * *